United States Patent [19]

Vandenberg

[11] 4,174,855
[45] Nov. 20, 1979

[54] WHEELED VEHICLE AXLE SUSPENSION SYSTEM

[75] Inventor: Ervin K. Vandenberg, Massillon, Ohio

[73] Assignee: Turner Quick-Lift Corporation, Canton, Ohio

[21] Appl. No.: 924,103

[22] Filed: Jul. 12, 1978

Related U.S. Application Data

[63] Continuation-in-part of Ser. No. 759,217, Jan. 13, 1977, abandoned.

[51] Int. Cl.² ............................................. B60G 9/04
[52] U.S. Cl. ................................... 280/711; 267/65 R
[58] Field of Search ..................... 280/672, 96.3, 676, 280/682, 683, 685, 698, 702, 711, 713, 726; 180/71; 267/64, 65 R

[56] References Cited

U.S. PATENT DOCUMENTS

| | | | |
|---|---|---|---|
| 2,879,076 | 3/1959 | Stricker | 280/682 |
| 2,993,706 | 7/1961 | Kilgore | 280/711 |
| 3,166,142 | 1/1965 | Frazier | 280/682 |
| 3,604,725 | 9/1971 | Goff | 280/672 |
| 3,746,363 | 7/1973 | Borns | 280/713 |

FOREIGN PATENT DOCUMENTS 1012088 12/1965 United Kingdom ..................... 280/672

*Primary Examiner*—Philip Goodman
*Attorney, Agent, or Firm*—Geoffrey R. Myers; William D. Hall

[57] ABSTRACT

The wheel hub cavity is used to accommodate a portion of the air bellows in an axle suspension of either the single or tandem drive axle type enabling the air bellows to be located directly over the axle and under the frame. The resulting lightweight, high load carrying capacity structure includes control arms for aligning and stabilizing the suspension and air bellows at both ends of the axle, adjacent the axle housing and extending outboard into the wheel hub cavity.

21 Claims, 3 Drawing Figures

WHEELED VEHICLE AXLE SUSPENSION SYSTEM

CROSS-REFERENCE TO RELATED APPLICATION

This application is a continuation-in-part of copending application Ser. No. 759,217 filed Jan. 13, 1977, now abandoned.

This invention relates to axle suspension systems for wheeled vehicles. More particularly, this invention relates to axle suspension systems useful as fixed air ride suspensions for the drive axles of truck chassis.

It is known that to obtain the maximum benefits of the isolating effect of air bellows in a suspension system, such bellows should generally be located directly above the axle (i.e., extend directly between the top of the axle and the lower flange of the truck frame). It is also known that for maximum roll stability, the air bellows should be spread outwardly as far as possible along the axle, hopefully to a point where their center line is not located any significant distance inboard of the vertical web of the vehicle's frame member.

Attempts to maximize these benefits conflict with competing considerations. For example, increasing braking performance requirements, particularly for heavy duty trucks, necessitate the use of service and spring brake containers on an increased number of axles. The drive axle of a vehicle, such as a truck chassis-cab, comprises intermediate its ends a drive axle housing (e.g., differential housing) which is of substantially larger size then the ends of the axle. On the ends of the axle, of course, are wheels which are minimally spaced from the frame of the vehicle. These three factors combine to define a rather limited three-sided "container" or space in which the bellows must fit if they are to be located over the axle.

Heretofore, this space was found to be too confining given the bellows size thought necessary, and, thus, the prior art in designing suspensions availed itself of the fourth, unconfined side of the space to offset the air bellows in order to get outside the limitations within the space. This was generally accomplished by employing a rather heavy longitudinally extending, offsetting equalizing beam, one end of which was connected to the axle while its other end retained the bellows sufficiently spaced from the axle housing, brake containers and wheels, so that the bellows fit into the system and were not impinged upon by the confining components during vehicle use.

In order to be sufficiently strong for their intended purpose, such equilizing beams must be rather large, heavy and rigid. Offsetting the bellows detracts from the cushioning effect of the ride (a typical prior art example is a ride frequency of 93 cycles/min. or more). Since payload capacity of a vehicle is diminished by the weight of a suspension, the equalizing beam detracts from payload capacity and, thus, reduces profits. Since the beam offsets the load-bearing bellows from the axle, potential weakness is inherent in such a system.

In view of the offset achieved by the equalizing beam, it is necessary to provide a rather large (e.g., 1 inch or more) clearance between the extremity (side wall) of the tire and the outer (i.e., outboard) surface of the bellows. This, coupled with what has been found by this invention to be, in many instances, the unnecessary inclusion of the upsprung weight of the axle and wheels in the determination of the size bellows needed to carry the required load, results in the requirement for large bellows and prevents their use directly above the axle. Such designs increase cost, diminish strength and add weight.

It is apparent from the above that there exists a need in the art for a suspension which overcomes the above-described problems. More particularly, it is apparent that there exists a need in the art for a lightweight suspension which can safely maximize the benefits of an air bellows system by locating the bellows substantially directly above the axle, and at the same time achieve the desired load carrying capacities. It is a purpose of this invention to fulfill these needs and provide the art with such a suspension.

This invention fulfills these needs by employing the hub cavity to accommodate a portion of the bellows and/or by using the concept that safe bellows capacity does not necessarily require including the unsprung weight of the wheels (i.e., wheel rims, tires, etc.) and axle.

Generally speaking, the suspensions contemplated by this invention comprise a drive axle having located intermediate its ends a drive axle housing of substantially larger cross sectional dimension than the ends of the axle and having located at its ends a wheel comprising a tire radially extending from a transverse rim and a hub of lesser transverse dimension than the tire and rim thereby defining a hub cavity between the axle and the tire and rim, a resilient bellows, means for locating the bellows in load-bearing relationship to the axle, and control arm means for connecting the axle to the frame of the vehicle, the system being particularly characterized by means for connecting one end of the resilient bellows to a longitudinal frame member of the truck and the other end to and substantially directly above the axle, one side of the bellows being thus located adjacent the enlarged housing of the axle and the opposite side extending into the hub cavity, the resilient bellows means comprising an inflatable and deflatable air bag which expands and contracts dimensionally in the vertical and horizontal direction during operation of the truck.

The term "extending into" the hub cavity is used herein in its generic sense to describe structurally a concept of this invention which is to use the hub cavity to accommodate an outboard portion of the airbags either some or all of the time that the vehicle has the bags installed thereon without the bags contacting the rim or tire. For example, this term includes the condition where a portion of the air bags extends into the cavity at all times and regardless of how much pressure is used or the posture of the axle. In addition, however, such a term also includes the condition, for example, where the bags under normal riding conditions and when inflated, do not extend into the hub cavity, but when a bag bottoms out such as when the tires hit a curb, etc., the bag is compressed and expands horizontally into the hub cavity. Other conditions where the cavity accommodates the bag only a part of the time and which are covered by this term, might be, for example, where the bags expand into the cavity during normal compression caused by axle movement, but which contracts horizontally out of the cavity when the bags rebound from normal compression, or where the bags extend normally into the cavity, but upon abnormal stretching (e.g. when a hole is traversed) the bags contract horizontally out of the cavity and clear the tires and rims.

In particularly preferred embodiments, the suspension is a tandem axle suspension in which at least one and often both axles are drive axles. In certain of these tandem suspensions, one or more of the following characteristics is achieved: the weight, exclusive of wheels, axle, upper control arms, and cross members is less than about 550 lbs.; the ride frequency is less than about 70 cycles/min. and there are four bellows of less than about 13 inches in diameter. All of these characteristics are achieved in the most preferred embodiments.

This invention will now be described with respect to certain embodiments thereof illustrated in the accompanying figures wherein:

IN THE DRAWINGS

Figure 1:
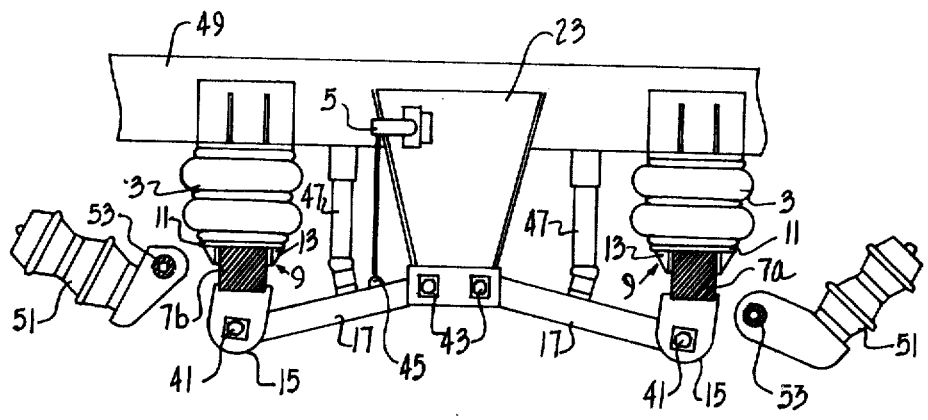
FIG. 1 is a side plan, partially sectionalized view of one embodiment of this invention.
Figure 2:
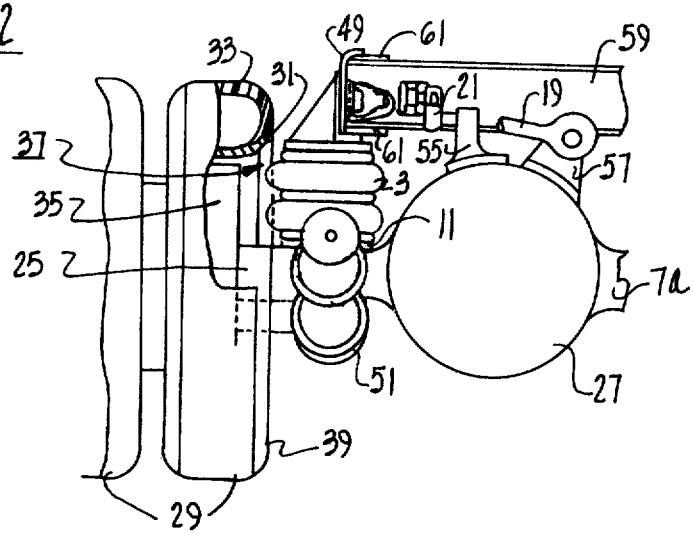
FIG. 2 is a partial rear plan, partially sectionalized view of the embodiment of FIG. 1.
Figure 3:
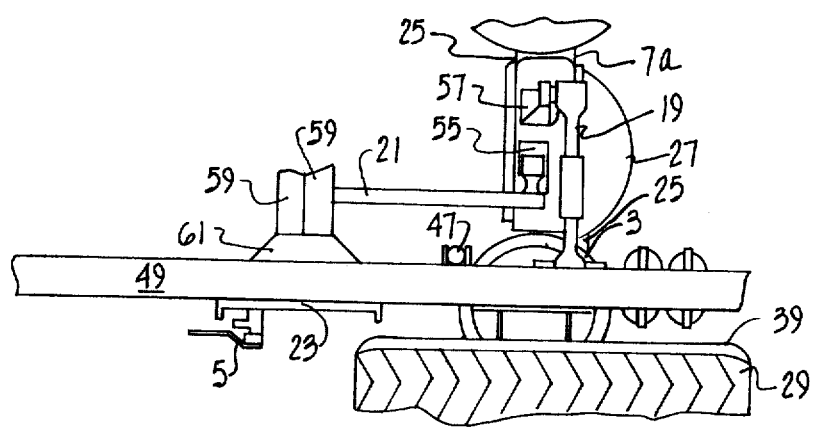
FIG. 3 is a top plan view of FIG. 2, showing a single wheel rather than a dual wheel assembly.

With references to the drawings, FIGS. 1 thru 3, there is illustrated an embodiment of this invention as generally represented by suspension 1. Suspension 1 is comprised of a pair of air bellows 3, axle connecting means 9 and 15, control arm means 17, 19, and 21, and hanger bracket 23 as well as other components hereinafter discussed. Suspension 1 is shown as a tandem, but could also be a single axle suspension which would comprise one half or the other of the tandem. Bellows 3 may be of any conventional configuration such as circular or oval. The bellows illustrated are circular, as they constitute for most suspensions the most readily available and economic bellows offered.

As alluded to hereinabove, it was heretofore felt that is calculating the capacity of air bellows (and, thus, size) needed, one had to include the unsprung weight (i.e., mass) of the wheels (tires, rims, brakes, etc.) and axle by the general formula: vehicle capacity equals upsprung mass plus suspension capacity. Suspension capacity is defined for a four air bellows tandem suspension as four (4) times (x) air bellows capacity. It now has been found that for the suspensions of this invention, particularly suspension 1 as illustrated, the inclusion of unsprung mass is unnecessary for either safety or strength. Since, in a typical example, unsprung mass may be 2800 lbs. or more, a significant savings translatable into bellows size and location is achieved. In other instances, this savings is translatable into increased vehicle capacities.

Air bellows 3, shown here as circular, are pressurized with air by an appropriate and conventional air line and valve system originating at the brake air compressor (not shown), including leveling valve 5 for maintaining substantially constant the vertical distance between the frame 49 and axles 7a and 7b, statically. An interconnecting airline conventionally maintains substantially equal axle loading statically. Bellows 3 are connected to tandem axles 7a and 7b by way of axle connecting means 9 comprised of an upper bellows platform 11 and a lower saddle 13. The connection is usually rigid and may conveniently be effected by welding saddle 11 to axles 7a and 7b.

While axles 7a and 7b are shown as rectangular, they may also be circular in accordance with standard practices. In either event, at least one or both of axles 7a and 7b are drive axles comprising (when a drive axle) intermediate their ends 25 a drive axle (e.g., differential) housing 27 of substantially larger cross-sectional dimension than their ends 25. At the ends 25 of axles 7a and 7b are wheels 29 are either single (as shown in FIG. 3) or dual (as shown in FIG. 2).

Wheels 29 include a transverse rim 31 having radially extending therefrom tires 33 and a hub 35 which connects the rim 31 and tire 33 to the end 25 of their respective axle 7a or 7b. As illustrated, tire 33 and transverse rim 31 are of a transverse dimension greater than hub 35, thus defining a hub cavity 37. Hub cavity 37 is, therefore, a vacant space bounded inwardly by hub 35 and radially by rim 31 and the tire line from rim 31 to the tire's outermost extremity or side wall 39.

In addition to the brake components (not shown) located in wheels 29, there is also usually present a brake chamber 51 (e.g., spring brake chamber) adjacent tire extremity 39 and located generally under but at times slightly outboard of frame 49. Chambers 51 (e.g., on the order of 30 inches) may be of any conventional design. At times, such chambers 51 extend upwardly a sufficient distance so as to extend into the space between the longitudinal planes of the bellows and above its bottom horizontal plane. Such chambers usually contain components of the service brakes as well as those for the emergency and parking brake system. Chamber 51 is physically and functionally connected to the brake components within wheels 29 by cam shaft (and support tube) 53 running transversely of the vehicles and adjacent axle 7a or 7b. In such a location, chambers 51 present a space limitation upon the location of air bellows 3, particularly in the longitudinal direction.

Located below axles 7a and 7b are rigidly connected thereto (e.g., as by welding) are lower control arm connecting means 15. Connecting means 15 are provided at their lower ends with conventional pivotal pin bushing connections 41 for pivotal connection of lower longitudinal control arms 17 thereto. Arms 17 are, in turn, pivotally connected at their opposite ends to hanger bracket 23 via the same type of conventional pivotal pin bushing connections 43 as connections 41. Generally, such bushings contain elastomeric material to provide for some deflection and energy storage in the connection itself during articulation of the suspension when in use. Lower control arms 17 thus connected by common hanger bracket 23 to their respective axles 7a or 7b serve to align and retain the axles in a longitudinal posture as well as to serve as a part of the illustrated four-link system. One of the arms (or beam) 17 may also serve as a locus 45 for the activating linkage of the leveling valve 5, and as a locus for shock absorbers 47. In this respect, member 49 may be the longitudinal frame of the vehicle itself or a unitizing longitudinal frame connecting member of the suspension which is connected to the frame of the vehicle.

In order to insure proper axle attitude during use, there is provided for each axle in the system an upper control arm assembly comprised of an upper transverse control arm 19 and an upper longitudinal control arm 21. These arms 19 and 21 are pivotally connected by appropriate and conventional means at their ends. For maximized roll stability, particularly when the vehicle is a truck tractor (i.e., employs a fifth wheel for trailer hauling), the end of arm 19 is connected to the top portion of axle housing 27 by elevated mounting bracket 57. The end of arm 19 opposite the end connected to mounting bracket 57 is connected to frame member 49. The end of arm 21 opposite the end connected to mounting bracket 55 is connected to cross-member 59. Cross-member 59 may be a part of the vehicle frame structure or an additional reinforcing member provided during installation of the suspension. Cross-members 59 are usually back-to-back "C" beams connected to frame 49 by connectors 61.

As can be seen best in FIGS. 2 and 3, this embodiment utilizes hub cavity 37 to allow clearance for a portion of air bellows 3. Because of this space, bellows 3 can be located directly above ends 25 (i.e., directly between the axle and frame) and adjacent housing 27 of axles 7a and 7b for maximized ride characteristics and yet be large enough to have sufficient capacity to carry the necessary load. In addition, and as illustrated, by employing hub cavity 37 to the degree desired, bellows 3 can be spread in a wide transverse configuration which contributes to vehicle roll stability. In fact, in preferred embodiments, the center line of bellows 3 are outboard the center line of frame 49. This increases roll stability over inboard positions.

In this respect, FIGS. 2-3 are generic illustrations of the use of cavity 37 to accommodate outboard portion of bellows (bags) 3. Bellows 3 expand and contract vertically according to pressure changes and/or the motion of the axle, thereby to give a cushioned ride on air. In doing so, because they are flexible (i.e., made of flexible rubber), bags 3 also expand and contract in the horizontal direction.

This flexible (resilient) nature of the bags with its horizontal and vertical expansion and contraction is put to use in this invention. For example, FIGS. 2-3 might illustrate the situation where bags 3 at all times extend into cavity 37. FIGS. 2-3 also might illustrate, however, the situation where bags 3 in normal condition exist outside cavity 37, but when compressed or depressurized extend into cavity 37. FIGS. 2-3 could also illustrate a condition where bags 3 extend into cavity 37, but during a relatively large stretching of bags 3 in the vertical direction are extracted from the hub cavity (by shrinkage in the horizontal direction) so that bags 3 do not hit the inboard surface of rim 31 or tire 33. This latter condition could arise during rebound from a deep compression or if the tire traverses a large hole.

Other specific conditions are possible, the FIGS. being generically illustrative of the use of cavity 37 to accommodate a portion of bags 3 in such a manner that bags 3 will not contact the wheels or tires during vehicle use and operation, yet achieve by location the advantages hereinabove described. In certain preferred embodiments a portion of bellows 3 exists in cavity 37 during at least all normal operation of the vehicle. In other preferred embodiments, the cavity is used only during heavy compression of the bags.

In such configurations, bellows 3 do not interfere with chambers 51, particularly if the capacity of such bellows is determined exclusive of the unsprung weight of the axle and wheels. It has been found that such a determination provides adequate capacity and safety and yet yields a dimensioned bellows capable of fitting into the available space and being transversely spread as described. A typical example of such a flexible (i.e., resilient) bellows useful in the practice of this invention is a Firestone Air-Ride #22 having an O.D. at 100 psi of about 12.9 inches.

When the suspensions of this invention are tandem axle suspensions and are manufactured using conventional grade materials, such suspensions are lightweight, have high strength components wnhich cannot be highly stressed by overloading, and excellent ride characteristics. The weight of any given suspension will vary depending upon what components are deemed a part of the suspension. Generally speaking, however, the art recognizes that when one refers to the "weight" of a suspension, one is referring to the weight of the components of the pure suspension and not, for example, the weight of the axles, wheels, cross members, or upper control arms. In this context, the illustrated embodiments of this invention achieve suspension weights of 550 lbs. or less when using conventional materials, and this is significantly less than heretofore known for a rugged, premium ride, tandem drive axle suspension, particularly where equalizing beams were employed. Referring to FIGS. 1 thru 3, the 550 lbs. refers to the weight of the bellows, connectors, lower control arms, hanger brackets and shocks on both sides of the vehicle (i.e., four bellows, four lower control arms, two hanger brackets, four shocks, and the bellows connectors), exclusive of the weight of the axle, wheels (including brakes), upper control arm mechanism, air lines, and, if present, cross members.

"Ride frequency" is a term well understood in the art and is used herein in accordance with this well-known meaning. By locating the bellows 3 substantially directly over and above the ends 25 of axles 7a and 7b (i.e., extending directly between frame and axle), ride frequency is minimized for a given air spring, and, thus, riding comfort or isolation from road shock is maximized. The illustrated tandem suspension using Firestone #22 Air Ride bellows (at 120 psi) achieves ride frequencies of less than about 70 cycles/minute at a rated load of at least 36,000 lbs.—a ride frequency which is significantly less than known systems heretofor employing offsetting equalizing beams for the bellows (e.g., ride frequencies of about 90 cycles/min. or more), and rated at the same load.

Once given the above description, many other features, modifications and improvements will become evident to the skilled artisan. Such other features, modifications, and improvements are considered a part of this invention, the scope of which is to be determined by the following claims.

I claim:

1. In an axle suspension system for a longitudinally frame membered truck, the system comprising a drive axle having located intermediate its ends a drive axle housing of substantially larger cross-sectional dimension than the ends of said axle and having located at each of its ends a wheel comprising a tire radially extending from a transverse rim and hub of lesser transverse dimension than said tire and rim thereby defining a hub cavity between the axle and the tire and rim, a resilient bellows means, means for locating the bellows in load-bearing relationship to the axle and control arm means for connecting the axle to the frame of the vehicle, the improvement comprising means for connecting one end of the resilient bellows means to a longitudinal frame member of the truck and the other end to and substantially directly above the axle, one side of said bellows being thus located adjacent the enlarged housing of the axle and the opposite side extending into said hub cavity, said resilient bellows means comprising an inflatable and deflatable air bag which expands and contracts dimensionally in the vertical and horizontal direction during operation of the truck axle.

2. The system of claim 1 wherein the capacity of the bellows does not include the unsprung weight of the wheels and axle.

3. A system according to claim 1 wherein said system is a tandem axle suspension system comprising as said control arm means an upper control arm assembly and a lower control arm assembly, and further comprising four resilient bellows, one bellows at each of the ends of said axles, at least one of said axles being a drive axle, said lower control arm assembly comprising four control arms, two on each side of said vehicle connected at one of their ends to a hanger bracket located intermediate the axles and connected at their opposite ends to their respective axle.

4. A system according to claim 3 which weighs, exclusive of axle, upper control arm assembly, and wheels, less than about 550 lbs.

5. A system according to claim 3 wherein both axles are drive axles having intermediate their ends said housing.

6. A system according to claim 1 which further includes shock absorbers connected at one end to the control arm means.

7. A system according to claim 1 wherein said lower control arms comprise a tubular longitudinally extending arm pivotally connected at its ends and serving to align the axle with the vehicle when the system is connected to the frames thereof.

8. A system according to claim 7 wherein said system is a tandem axle suspension system weighing, exclusive of axle, wheels and upper control arms, less than about 550 lbs., and wherein said system is further comprised of four resilient bellows, one bellows at each of the ends of said axles, at least one of said axles being a drive axle, upper control arm means and four lower control arms, two on each side of said vehicle connected at one end to a common hanger bracket located intermediate the axles and connected at their opposite ends to their respective axle.

9. A system according to claim 1 wherein said system has a load-carrying capacity which does not include the unsprung weight of the axle and wheels.

10. A system according to claim 9 having a load-carrying capacity per axle of at least about 18,000 lbs., and wherein said air bellows are substantially circular in cross section and have a diameter of less than about 13 inches when pressurized to about 100 psi.

11. A system according to claim 10 wherein said system is a tandem axle suspension system which weighs exclusive of axle, wheels and upper control arms, less than 550 lbs.

12. A system according to claim 1 wherein said wheels include a brake cylinder extending therefrom adjacent said axle and extending into the longitudinal plane defined by the extremities of said bellows.

13. In a truck-tractor having a longitudinally extending frame member on either side thereof, a drive axle for transmitting power from the engine to wheels attached to said drive axle transversely to the longitudinally extending frame members, wherein said drive axle includes intermediate the ends thereof a drive axle housing of substantially larger cross-sectional dimension than the ends of said axle and wherein said wheels include a tire centrally retained upon and extending radially outwardly from a transverse wheel rim and a radially extending hub means for connecting the wheel rim to the axle, the tire and rim having a transverse dimension greater than that of the hub means thereby defining a hub cavity between the axle and the tire and rim, the improvement comprising as said axle suspension system, and on each side of said truck-tractor relative to a respective longitudinally extending frame member, a system comprised of a resilient bellows means connected at its upper end to a frame member and at its lower end to and substantially directly above said axle, one side of said bellows being adjacent the enlarged housing of the axle and the opposite side extending into said hub cavity, a downwardly extending hanger bracket connected at its upper end to the frame member at a spaced distance from said bellows and at its lower end to one of a longitudinally extending lower control arm whose other end is connected to said axle, and wherein said resilient bellows means comprises an inflatable and deflatable air bag which expands and contracts dimensionally in the vertical and horizontal direction during operation of the truck-tractor.

14. The truck-tractor according to claim 13 wherein said suspension system is a tandem axle suspension system, there are two longitudinally spaced axles, at least one of said axles being a drive axle having said housing and wherein said hanger bracket is common to the control arm for each longitudinally spaced axle.

15. The truck-tractor according to claim 14 wherein both of said axles are drive axles, each of which is provided with said housing.

16. The truck-tractor according to claim 13 wherein said wheels further include and have extending therefrom an elongated brake cylinder means adjacent said axle and extending into the longitudinal plane defined by the extremities of said bellows.

17. The truck-tractor according to claim 13 which further includes at least one longitudinal and one transverse upper control arm pivotally connected on one of their ends to a frame of the vehicle and at their opposite ends to the axle.

18. The truck-tractor according to claim 7 wherein said upper control arms are connected to said axle by means connected to and extending upwardly above said drive axle housings.

19. The truck-tractor according to claim 18 wherein said system is a tandem axle suspension weighing, exclusive of axle, wheels, and upper control arms, less than about 550 lbs. and has a ride frequency of less than about 70 cycles/min.

20. The truck-tractor according to claim 19 wherein said bellows are substantially circular air bellows having a diameter of less than about 13 inches at 100 psi and the load carrying capacity of the suspension is at least about 18,000 lbs. per axle.

21. The truck-tractor according to claim 13 wherein said bellows are located substantially directly under the frame member of the truck-tractor.

* * * * *